Aug. 14, 1934.     T. A. KIRTON     1,970,461
LICENSE TAG
Filed April 21, 1931     3 Sheets-Sheet 1
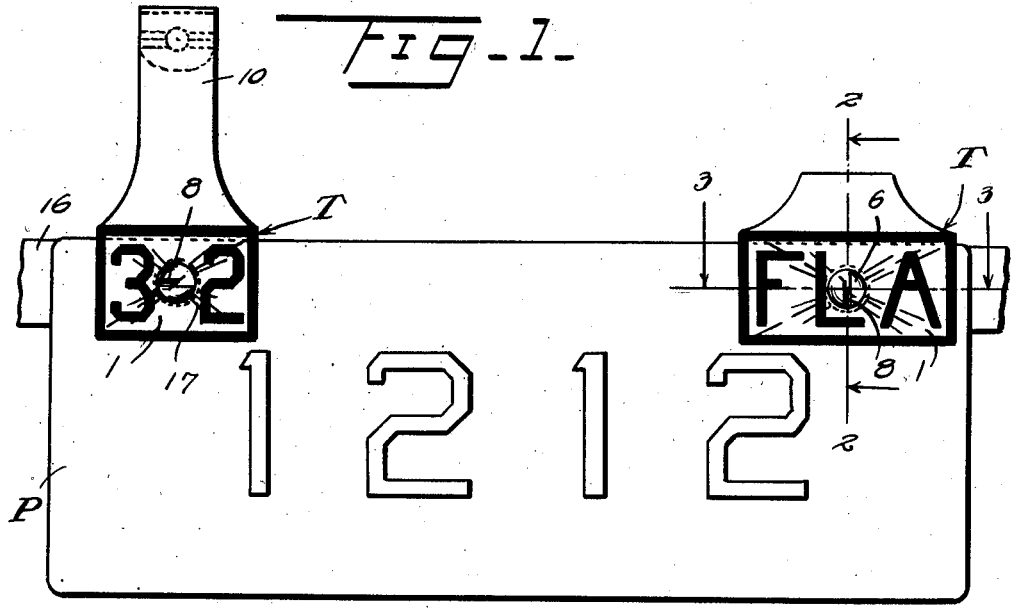
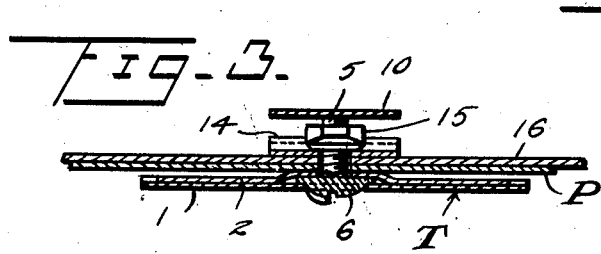
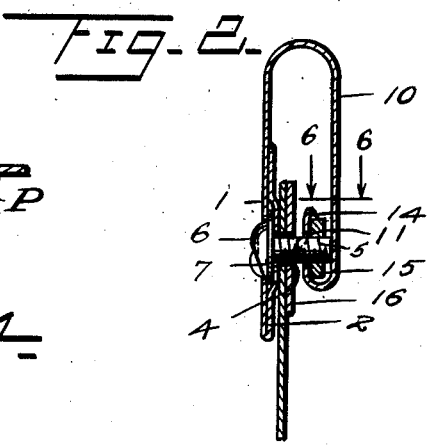
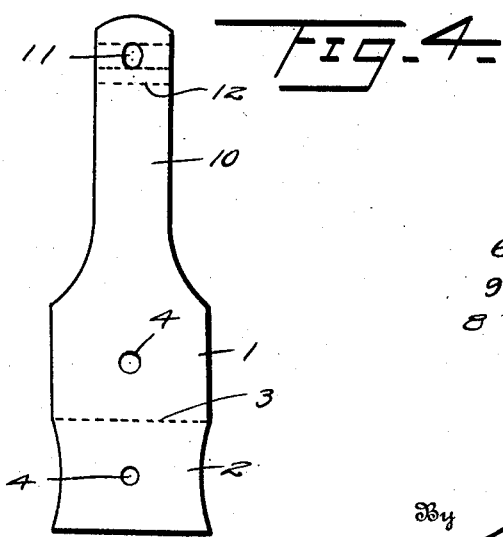
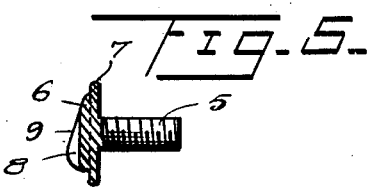
Inventor
T. A. Kirton
By Watson E. Coleman
Attorney Aug. 14, 1934.  T. A. KIRTON  1,970,461
LICENSE TAG
Filed April 21, 1931    3 Sheets-Sheet 2
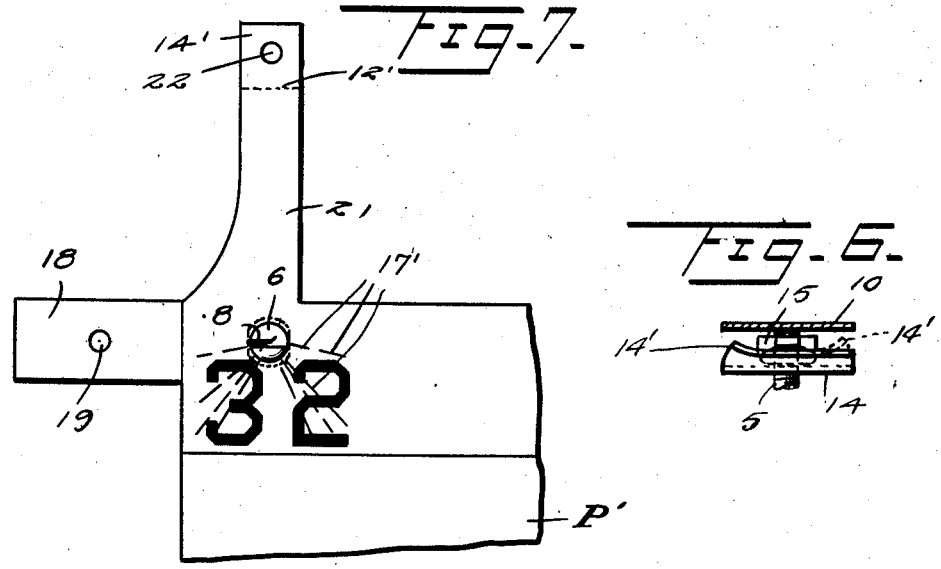
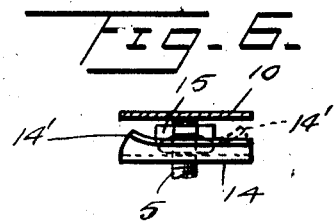
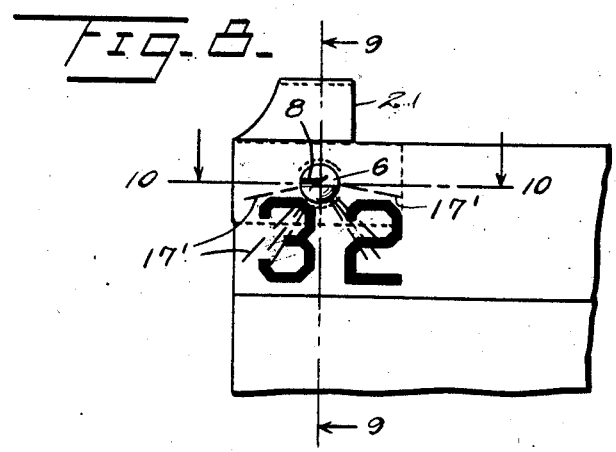
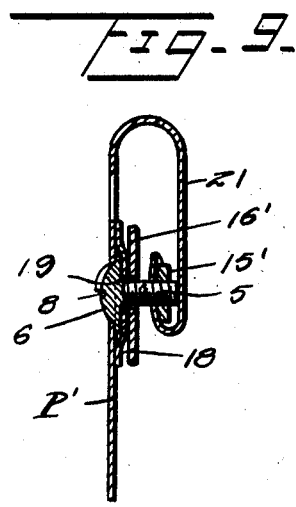
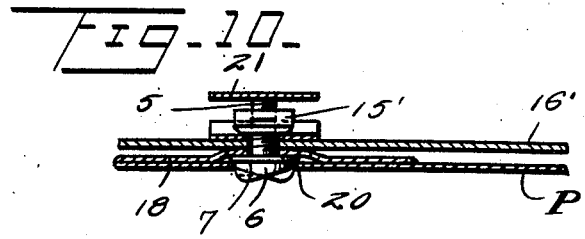
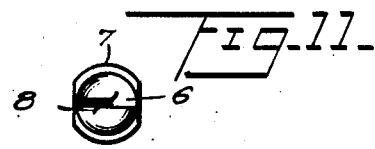
Inventor
T. A. Kirton
By Watson E. Coleman
Attorney Aug. 14, 1934.　　　T. A. KIRTON　　　1,970,461
LICENSE TAG
Filed April 21, 1931　　3 Sheets-Sheet 3
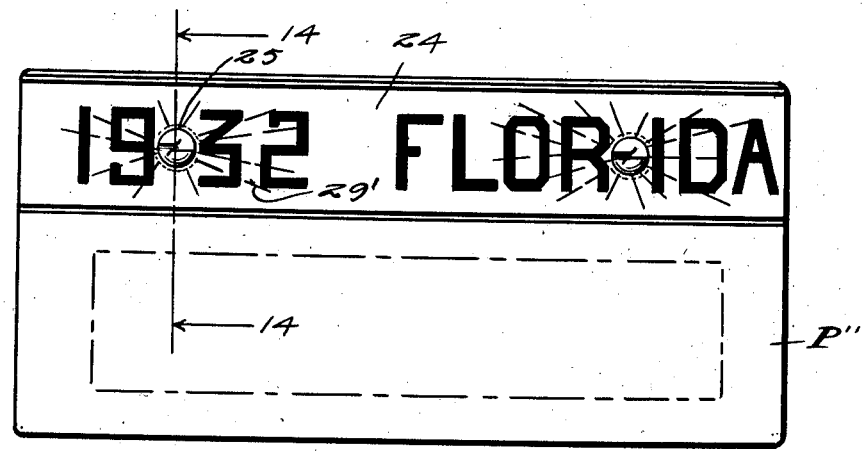
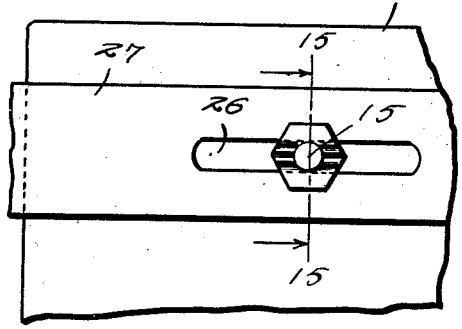
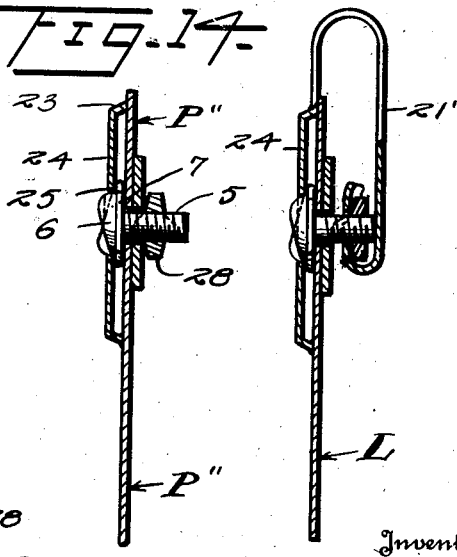
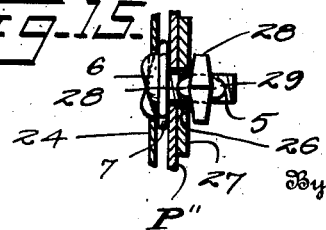
Inventor
T. A. Kirton
By Watson E. Coleman
Attorney Patented Aug. 14, 1934

1,970,461

UNITED STATES PATENT OFFICE 1,970,461

LICENSE TAG

Thomas A. Kirton, Jacksonville, Fla.

Application April 21, 1931, Serial No. 531,814

16 Claims. (Cl. 40—125)

This invention relates to license tags, and it is primarily an object of the invention to provide a tag of this kind which is so constructed and assembled as to render the same non-transferable.

It is also an object of the invention to provide a tag of this kind having associated therewith a means for attaching the tag or plate and which attachment is of a character requiring destruction of the plate or a portion thereof thus preventing further use of the tag or plate without detection.

Furthermore, it is an object of the invention to provide a tag adapted for use in connection with a license plate to identify a year, a State or the like and which tag after being applied to the plate must be destroyed before being removed.

The invention consists in the details of construction and in the combination and arrangement of the several parts of my improved license tag whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation illustrating a license plate constructed in accordance with an embodiment of my invention;

Figure 2 is a detailed sectional view taken substantially on the line 2—2 of Figure 1 looking in the direction of the arrow;

Figure 3 is a detailed sectional view taken substantially on the line 3—3 of Figure 1 looking in the direction of the arrow;

Figure 4 is a view in plan of the blank from which the tag is produced;

Figure 5 is a view partly in section and partly in elevation of one of the holding bolts as herein employed;

Figure 6 is a detailed sectional view taken substantially on the line 6—6 of Figure 2 looking in the direction of the arrow;

Figure 7 is a fragmentary elevational view illustrating another embodiment of my invention;

Figure 8 is a view similar to Figure 7 showing certain of the parts in a second position or adjustment;

Figure 9 is a detailed sectional view taken substantially on the line 9—9 of Figure 8;

Figure 10 is a detailed sectional view taken substantially on the line 10—10 of Figure 8;

Figure 11 is a view in elevation of the outer end of the holding screw as herein employed;

Figure 12 is an elevational view illustrating a further embodiment of my invention;

Figure 13 is a fragmentary view in rear elevation of the device as illustrated in Figure 12;

Figure 14 is a detailed sectional view taken substantially on the line 14—14 of Figure 12;

Figure 15 is a detailed sectional view taken substantially on the line 15—15 of Figure 13 with the holding bolt in elevation;

Figure 16 is a view similar to Figure 14 but showing a still further embodiment of my invention.

In the embodiment of my invention as illustrated in Figures 1 to 6 of the accompanying drawings, P denotes a license plate with the upper marginal portion of which are adapted to be associated the tags T, one of said tags being employed to indicate the year and the other the State. In blank as illustrated in Figure 4, the tag T comprises a body portion 1 adapted to have disposed over its rear face a flap 2, said flap being adapted to be bent along the line 3 indicated in Figure 4. The body portion 1 and the flap 2 have openings 4 adapted to register. The openings 4 are of differing diameters, the larger opening 4 being in the body portion 1. These openings register when the flap 2 is bent back along the line 3 but before the flap 2 is turned back the shank 5 of a bolt or kindred member is inserted from the rear through the opening 4 of the flap 2 so that when the flap 2 is properly turned back the head 6 of the shank 5 will be received within the opening 4 in the body portion 1. When the flap 2 is in overlying position one or more of its marginal edges is adapted to be welded or otherwise secured to the adjacent portion of the rear face of the body portion 1.

The shank 5 is provided with a head 6, the inner portion of which is substantially defined by a surrounding and outstanding flange or skirt 7 which fits between the returned flap 2 and the body portion 1 whereby the shank is held against displacement yet free to rotate. In order to allow the flange 7 to extend between the returned flap 2 and the body portion 1, the opening 4 in the body portion 1 is of a diameter slightly in excess of the diameter of the head 6 proper of the shank as particularly illustrated in Figures 2 and 3 of the drawings. The outer face of the head 6 is provided with shoulders 8 with which a screw driver or the like may be engaged to turn the shank 5 into working position, the surface of the head 6 being provided with opposed inclines 9 to reject the screw driver or kindred implement should effort be made to unscrew the applied stud 5.

The margin of the body portion 1 opposite to the bend 3 is provided with an extended tongue 10, the outer portion of which is provided with an opening 11 which is adapted to receive the free end portion of the applied shank 5 upon bending the tongue 10 inwardly of the body portion 1 as indicated in Figures 1 and 2 of the drawings. The free end portion of the tongue 10, however, is adapted to be first reverted on the line 12 as indicated by broken lines in Figure 4 to provide an inwardly disposed flap 14. A nut 15 is positioned between the flap 14 and the adjacent portion of the tongue 10 and through which nut 15 the shank 5 is threaded whereby the tag T is effectively locked to the plate P and also, if desired, the plate P is effectively locked to a supporting bar 16 or the like.

The bending of the tongue 10 and the flap 14 is such as to substantially eliminate access to the nut 15 to allow release of the shank 5, such access to the applied nut 15 being preferably further prevented by bending inwardly, as at 14' (Figure 6), the side marginal portions of the flap 14. In Figure 6 the inward bend at one end of the flap 14 is diagrammatically indicated by broken lines.

With each of the tags T applied in accordance with the structure hereinbefore particularly recited, it is to be noted that such tag cannot be removed without destroying either the tag T or the plate P. However, to facilitate removal of the tag T the body portion 1 along one or more lines 17 is weakened so that by imposing a pull on the portion 1 by a wrench or other implement, the opening 4 may be enlarged or distorted sufficiently to permit proper manipulation of the shank 5 to impose reverse or retrograde rotation thereto. It will be evident, however, that in order to obtain this release of the shank 5 the body portion 1 of a tag T may be substantially destroyed. This is of particular advantage as a tag is provided which may not be transferred or reused without detection.

In the embodiment of my invention as illustrated in Figures 7 to 10 inclusive, the plate P' at a corner thereof is provided with an elongated tongue 18 and which tongue may be an integral part of the plate P', welded or otherwise attached thereto. This tongue is provided with an opening 19 which, when the tongue is returned to overlie the plate P' proper, registers with the opening 20 in the plate P' through which the head 6 of the shank 5 is exposed. The flange 7 of the head 6 is engaged between the plate P' and the returned tongue 18, said tongue being welded or otherwise secured to the rear face of the plate P'.

The same corner of the plate P' is also provided with a second elongated tongue 21 initially substantially at right angles to the tongue 18 and which tongue 21 in its outer or free end portion is provided with an opening 22 through which the free end portion of the shank 5 is disposed when the tongue 21 is folded to lap the rear face of the plate P' and preferably the supporting bar or kindred member 16' for the plate proper. The outer extremity of the tongue 21 is adapted to be initially returned on the line 12' to provide a flap 14' and the holding nut 15' is positioned between said flap 14' and the adjacent portion of the tongue 21 proper. The plate P' adjacent to the opening 20 is also weakened along the lines 17' so that the same may be torn or destroyed to allow access to the shank 5 when it is desired to remove the plate P'.

In the embodiment of my invention as illustrated in Figures 12 to 15 inclusive, the plate P'' has welded or otherwise secured along a marginal portion thereof the side flanges 23 of a channel plate 24. Received between the applied channel plate 24 and the plate P'' is the flange 7 of the head 6 of the holding bolt 5, said head 6 being disposed through a suitably positioned opening 25 in the plate 24. As particularly illustrated in Figures 13 and 14 the applied bolt 5 is disposed through a slot 26 provided in a holding bar 27 or the like and the retaining nut 28 upon the shank 5 is provided with the lugs or flanges 29 adapted to be received within the slot 26 whereby said applied nut 28 is effectively held against removal. In applying the shank 5 the nut 28 is first positioned against the back of the bar 27 with the lugs or flanges 29 extending within the slot 26. The shank 5 can then be readily threaded through the nut 28 as it is not necessary to impart turning movement directly to the nut. The plate 24 adjacent each of the openings 25 is weakened on the lines 29' to allow the desired breakage of the plate 24 to facilitate removal of the bolt 5 when it is desired to take off the plate P''.

The embodiment of my invention as illustrated in Figure 16 is substantially the same as that illustrated in Figures 12 to 15 inclusive except that the license plate L is provided with an elongated tongue 21' welded or otherwise connected to the plate L and which is adapted to be used in the same manner and for the same purpose as hereinbefore set forth with respect to the tongue 21.

In the appended claims in referring to a tag this definition is intended to cover the license plate P or its equivalent or a tag T as illustrated in the accompanying drawings.

From the foregoing description it is thought to be obvious that a license tag constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A non-transferable tag comprising two overlying members connected one to the other and provided with registering openings, a holding shank disposed through one of said openings and having a flange extending between the overlying members whereby the shank is prevented from being withdrawn through either of the openings, one of the members adjacent to the opening being weakened to allow breakage of such member when it is desired to remove the holding shank.

2. A non-transferable tag comprising two overlying members connected one to the other and provided with registering openings, a holding shank disposed through the opening in one of the members and having a flange extending between the overlying members whereby the shank is prevented from being withdrawn through either of the openings, one of the members adjacent to the opening being weakened to allow breakage of such member when it is desired to remove the holding shank, said shank having a head exposed through the opening in the second member, the outer surface of said head being rounded and provided with shoulders between which an implement is adapted to be engaged to turn the shank in one direction, said outer surface of the head being provided with opposed inclines to prevent an implement engaged between the shoulders turning the shank in the opposite direction.

3. A non-transferable tag comprising two overlying members connected one to the other and provided with registering openings, a holding shank disposed through one of said openings and having a flange extending between the overlying members whereby the shank is prevented from being withdrawn through either of the openings, one of the members adjacent to the opening being weakened to allow breakage of such member when it is desired to remove the holding shank, a retaining nut coacting with the shank, and a retaining means for the applied nut.

4. In combination with a tag, a member overlying said tag, said tag and member having registering openings, a securing shank disposed through one of said registering openings and having a flange received between the tag and the member whereby said shank is held against removal through the opening in either the tag or the member, a tongue secured to the tag, and a nut carried by the tongue, said nut being adapted for engagement with the shank.

5. A non-transferable tag comprising two overlying members connected one to the other and provided with registering openings, a holding shank insertible through one of said openings and having a flange extending between the overlying members whereby the shank is prevented from being withdrawn through either of the openings, a nut threading on said shank, and means for holding the nut against rotation.

6. In combination with a tag, a member overlying said tag, said tag and member having registering openings, a securing shank disposed through one of said registering openings and having a flange received between the tag and the member whereby said shank is held against removal through the opening in either the tag or the member, a tongue carried by the tag and overlying a face of the tag, a holding member engageable with the shank, and means carried by the tongue for maintaining the holding member against displacement.

7. A plate or display holder, comprising a bracket; a clip cooperating therewith, and comprising two leg portions, each having an extremity folded back thereupon, a recess being defined between complementary portions of one of the said legs and its folded back extremity; a lock nut placed in said recess; and a bolt extending through said clip, said plate or display, and said bracket, and threading into the said nut, said bolt having means co-operating with said nut for preventing withdrawal of the bolt without destruction of the plate or display.

8. A license tag holder comprising a bracket; a substantially U-shaped clip cooperating therewith, and comprising two leg portions, each having an extremity folded inwardly back thereupon, one of the said legs having complementary portions in the main portion of the said leg and in its extremity, the said portions defining a recess; a lock nut mounted in the said recess; the extremity of the other of the said legs having a portion therein co-operating with the main portion of the leg to define a recess; and a bolt passing through the said clip and having a skirt portion concealed in the said last-mentioned recess, the said bolt also passing through the license tag and bracket and threading into the said nut, said bolt having means cooperating with the nut, for preventing withdrawal of the bolt without destruction of the tag.

9. A license tag holder comprising a bracket; a substantially U-shaped clip cooperating therewith, and comprising two leg portions, each having an extremity folded inwardly back thereupon, one of the said legs having complementary portions in the main portion of the said leg and in its extremity, the said portions defining a recess; a lock nut mounted in the said recess; the extremity of the other of the said legs having a portion therein cooperating with the main portion of the leg to define a recess; and a bolt passing through the said clip and having a skirt portion concealed in the said last-mentioned recess, the said bolt also passing through the license tag and bracket and threading into the said nut, the said bolt having shoulders whereby the bolt can be turned in one direction by an ordinary screwdriver to seat the bolt in the nut, but rendering the said screwdriver incapable of turning the bolt in the opposite direction.

10. As an element of a plate or display holder, a clip having cooperating leg portions, each leg portion having inwardly turned extremities bent back thereupon, the main portion and the extremity of one leg having complementary portions defining a recess; a lock nut received in said recess, means in the other leg for holding a bolt; the said bolt extending through said last-mentioned leg and threading into the said lock nut, the said bolt having means cooperating with said nut for preventing withdrawal of the bolt without destruction of the said plate or display.

11. As an element of a plate or display holder, a substantially U-shaped clip, the leg portions of which have inwardly turned extremities bent back thereupon, and secured thereto, the main portion and the extremity of one leg having complementary portions defining a recess; a lock nut mounted in said recess; the extremity of the other leg having a portion defining together with the main portion, a second recess; a bolt having a skirt portion by means of which it is secured in said last-mentioned leg, and adapted to thread into the said nut, said bolt having means, cooperating with said nut, for preventing withdrawal of the bolt without destruction of the tag.

12. As an element of a plate or display holder, a substantially U-shaped clip, the leg portions of which have inwardly turned extremities bent back thereupon, and secured thereto, the main portion and the extremity of one of said legs having complementary portions defining a recess; a lock nut retained in the said recess; a bolt passing through said other leg, and having a skirt thereon, the said last-mentioned leg retaining said bolt by means of said skirt; the said bolt having shoulders thereon whereby it can be turned in one direction by means of an ordinary screwdriver for seating it in said lock nut, but rendering the screwdriver incapable of turning the bolt in the opposite direction.

13. A device of the class described comprising two overlying members, a shank disposed through one of the members and having a head, the second member having an opening through which said head is exposed, a nut on the shank, the second member having means to hold the nut against rotation, said shank having means to allow engagement therewith of an implement to turn the shank in one direction, said means preventing the implement imparting retrograde rotation to the shank.

14. A non-transferable tag carrying two overlying members provided with registering openings, a holding shank disposed through one of said openings and having a flange extending between the overlying members whereby the shank is prevented from being withdrawn through either of the openings, the opening in the second member allowing access to the shank.

15. A non-transferable tag carrying two overlying members provided with registering openings, a holding shank disposed through one of said openings and having a flange extending between the overlying members whereby the shank is prevented from being withdrawn through either of the openings, one of the members adjacent to the opening being weakened to allow breakage of such member when it is desired to remove the holding shank.

16. As a new article of manufacture, a tag and a securing means therefor disposed through the tag, said means being removable from the tag only upon tearing the tag, the portion of the tag through which the securing means is disposed being weakened to allow tearing of the tag when it is desired to remove the securing means.

THOMAS A. KIRTON.